United States Patent
Krach et al.

(10) Patent No.: US 7,894,983 B2
(45) Date of Patent: Feb. 22, 2011

(54) METHOD FOR ESTIMATING PARAMETERS OF A NAVIGATION SIGNAL

(75) Inventors: Bernhard Krach, Hilpoltstein (DE); Michael Lentmaier, Munich (DE)

(73) Assignee: Deutsches Zentrum fuer Luft-und Raumfahrt e.V, Cologne (DE)

( * ) Notice: Subject to any disclaimer, the term of this patent is extended or adjusted under 35 U.S.C. 154(b) by 691 days.

(21) Appl. No.: 11/999,134

(22) Filed: Dec. 4, 2007

(65) Prior Publication Data
US 2008/0154487 A1 Jun. 26, 2008

(30) Foreign Application Priority Data
Dec. 8, 2006 (EP) .................................. 06125702

(51) Int. Cl.
G01C 21/30 (2006.01)
G01C 21/32 (2006.01)

(52) U.S. Cl. ....................... 701/208; 701/200; 701/214; 340/995.25; 342/450; 73/178 R

(58) Field of Classification Search ................. 701/200, 701/208, 214; 78/178 R; 340/995.25, 988; 342/450; 455/456.1, 456.6, 404.2
See application file for complete search history.

(56) References Cited

U.S. PATENT DOCUMENTS

| | | | |
|---|---|---|---|
| 5,293,642 A * | 3/1994 | Lo ........................... | 455/456.2 |
| 5,311,173 A * | 5/1994 | Komura et al. ......... | 340/995.22 |
| 5,613,205 A * | 3/1997 | Dufour ....................... | 455/440 |
| 5,890,068 A * | 3/1999 | Fattouche et al. ........ | 455/456.2 |
| 6,047,192 A * | 4/2000 | Maloney et al. .......... | 455/456.2 |

(Continued)

FOREIGN PATENT DOCUMENTS

DE 102007044671 A1 * 4/2009

(Continued)

OTHER PUBLICATIONS

Comparison between particle filter approach and Kalman filter-based technique for head tracking in augmented reality systems Ababsa, F. et al.; Robotics and Automation, 2004. Proceedings. ICRA '04. 2004 IEEE International Conference on; vol. 1 Digital Object Identifier: 10.1109/ROBOT.2004.1307284; Pub. Year: 2004 , pp. 1021-1026 vol. 1.*

(Continued)

*Primary Examiner*—Cuong H Nguyen
(74) *Attorney, Agent, or Firm*—Shumaker & Sieffert, P.A.

(57) ABSTRACT

The method for estimating parameters of a navigation signal received by a receiver which receives navigation signals through a plurality of paths wherein the parameters include data modulated on the navigation signal and complex amplitudes i.e. amplitude and phase shift, and time delays of the individual paths, comprises receiving a navigation signal and sampling the received navigation signal. Moreover, the parameters are sequentially estimated in terms of a posterior probability density function. For facilitating the sequential estimation, the received vector is transformed into a compressed vector without loss of information by using a correlator bank having a plurality of correlator reference signals. The sets of samples representing the posterior probability function of the parameters are sequentially calculated by nonlinearly, recursively filtering the compressed vector and optionally predicting the complex amplitude and time delays by performing equivalent time delay shifts and phase shifts of the correlator signals of the correlator bank.

2 Claims, 5 Drawing Sheets

U.S. PATENT DOCUMENTS

| | | | | |
|---|---|---|---|---|
| 6,249,252 | B1 * | 6/2001 | Dupray | 342/450 |
| 6,826,284 | B1 * | 11/2004 | Benesty et al. | 381/92 |
| 7,340,259 | B2 * | 3/2008 | Maloney et al. | 455/456.1 |
| 7,525,484 | B2 * | 4/2009 | Dupray et al. | 342/450 |
| 7,680,501 | B2 * | 3/2010 | Sillasto et al. | 455/456.1 |
| 7,714,778 | B2 * | 5/2010 | Dupray | 342/357.31 |
| 7,764,231 | B1 * | 7/2010 | Karr et al. | 342/457 |

FOREIGN PATENT DOCUMENTS

| | | |
|---|---|---|
| EP | 1 288 672 A1 | 3/2003 |
| EP | 1930740 A1 * | 6/2008 |
| JP | 02078907 A * | 3/1990 |
| JP | 10054729 A * | 2/1998 |
| WO | WO 95/14937 | 6/1995 |
| WO | WO 2008147911 A1 * | 12/2008 |
| WO | WO 2010012303 A2 * | 2/2010 |

OTHER PUBLICATIONS

Bayesian DII for Multipath Mitigation in Navigation Systems Using Particle Filters; Closas, P. et al.; Acoustics, Speech and Signal Processing, 2006. ICASSP 2006 Proceedings. 2006 IEEE International Conference on; vol. 4; Digital Object Identifier: 10.1109/ICASSP. 2006.1660922; Publication Year: 2006 , pp. IV-IV.*

On the probability density function of the LMS adaptive filter weights; Bershad, N.J. et al.; Acoustics, Speech and Signal Processing, IEEE Transactions on; vol. 37 , Issue: 1; Digital Object Identifier: 10.1109/29.17499 Publication Year: 1989 , pp. 43-56.*

Vehicle Localization with Global Probability Density Function for Road Navigation; Chenhao Wang et al..; Intelligent Vehicles Symposium, 2007 IEEE; Digital Object Identifier: 10.1109/IVS.2007. 4290252; Publication Year: 2007 , pp. 1033-1038.*

A Predictive and Accurate Interconnect Density Function: The Core of a Novel Interconnect-Centric Prediction Engine Atghiaee, A.; Masoumi, N.; Very Large Scale Integration (VLSI) Systems, IEEE Transactions on; vol. PP , Issue: 99 Digital Object Identifier: 10.1109/ TVLSI.2010.2053946; Publication Year: 2010 , pp. 1-14.*

Evaluation of a robot learning and planning via extreme value theory; Celeste, F. et al.; Information Fusion, 2007 10th International Conference on; Digital Object Identifier: 10.1109/ICIF.2007.4408187; Publication Year: 2007 , pp. 1-8.*

Sequential Monte Carlo implementation and state extraction of the group probability hypothesis density filter for partly unresolvable group targets-tracking problem; Lian, F. et al.; Radar, Sonar & Navigation, IET; vol. 4 , Issue: 5 Digital Object Identifier: 10.1049/iet-rsn.2009.0109; Pub. Year 2010 , pp. 685-702.*

Steven M. Kay, "The Bayesian Philosophy," Fundamentals of Statistical Signal Processing—Estimation Theory, Prentice Hall Signal Processing Series, Prentice Hall, New Jersey, 1993, pp. 309-377.

J. J. Spilker Jr., "Fundamentals of Signal Tracking Theory," American Institute of Aeronautics and Astronautics, Inc., 1994, pp. 244-327.

M. Sanjeev Arulampalam et al., "A Tutorial on Particle Filters for Online Nonlinear/Non-Gaussian Bayesian Tracking," IEEE Transactions on Signal Processing, vol. 50, No. 2, Feb. 2002, pp. 174-186.

Jesús Selva Vera, "Efficient Multipath Mitigation in Navigation Systems," Ph.D. Dissertation, Department of Signal Theory and Communications, Dec. 9, 2003, pp. 15-50.

Jesús Selva, "Complexity reduction in the parametric estimation of superimposed signal replicas," Signal Processing, Elsevier Science, vol. 84, Issue 12, Dec. 2004, pp. 2325-2343.

A.J. Jazwinski, "Introduction to Filtering Theory," Stochastic Processes and Filtering Theory, New York: Academic Press, 1970, pp. 142-161.

Michael Lentmaier et al., "Maximum Likelihood Multipath Estimation in Comparison with Conventional Delay Lock Loops," Proceedings of the ION GNSS 2006, Forth Worth, Texas, Sep. 2006, pp. 1741-1751.

Sleewaegen, J., "Multipath Mitigation, Benefits from using the Signal-to-Noise Ratio," Proceedings of ION GPS-97, Kansas City, Sep. 16-19, 1997, pp. 531-541.

* cited by examiner

METHOD FOR ESTIMATING PARAMETERS OF A NAVIGATION SIGNAL

BACKGROUND OF THE INVENTION

1. Field of the Invention

The present invention relates to a method for estimating parameters of a navigation signal which is received by a receiver which receives navigation signals through a plurality of paths wherein the parameters include data modulated on the navigation signal and complex amplitudes, e.g. amplitude and phase shift, and time delays of the individual paths.

2. Description of the Prior Art

Estimation of signal parameters (in particular delay and phase) of signals, which are transmitted by signal transmitters of known position to the receiver allow for position determination of the receiver within the three-dimensional space, insofar as within a synchronous system wherein the receiver clock is synchronized to the clocks of the transmit stations at least the signals of three transmitting station can be received. When the receiver clock is not synchronized to the clocks of the transmit stations, it is required to receive at least the signals of four transmit stations simultaneously, as in addition to the three spatial coordinates of the receiver position also the clock error of the receiver has to be estimated. The described method of positioning is commonly termed Time-of-Arrival (TOA) or pseudoranging and is used by satellite navigation systems for instance. If beside the delay estimate also the phase estimates are used the method is termed carrier phase positioning.

Considering a two-dimensional scenario for instance the delay estimates yield circles around the transmitters in the position domain, whereas their intersections indicate possible positions of the receiver as illustrated in FIG. 1. In practice some of the intersection points can be disregarded due to prior knowledge, such that a non-ambiguous solution exists. Analogously to the two-dimensional problem in a three-dimensional scenario the delay estimates are represented by spheres in the position domain, whereas the center points of each sphere are the transmit stations respectively.

A major problem for the TOA method are errors of the respective delay and phase estimates, which result in errors of the position estimate. Commonly for obtaining the delay estimates the delay-lock-loop (DLL) and for obtaining the phase estimates a phase-lock-loop (PLL) is used. The key idea is to have a method available, which is able to outperform the conventional DLL+PLL architecture with respect to the quality of the signal parameter estimates delay and phase. As the uncertainty within the signal parameter estimates is transformed into an uncertainty of the position estimate a further objective is to handover a complete probability density function for the signal parameters over to the position estimation, which is restricted to a Gaussian density for the conventional DLL+PLL architecture.

DLL as well as PLL are simple tracking loops. The DLL approximates a sequential estimator for the delay using an iterative gradient method which keeps track of the cross-correlation peak of a receiver reference signal and the received signal. The derivative of the correlation function is approximated by differencing the correlation values obtained by two reference signals that are delayed by $\tau_0+0.5\Delta$ and in advance by $\tau_0-0.5\Delta$ (early and late correlators) with respect to assumed maximum at $\tau_0$. Thereby $\Delta$ is termed the correlator spacing. Via a control loop that controls the velocity of the reference signals using a voltage or number controlled oscillator (VCO/NCO) the DLL adjusts the VCO/NCO such that the derivate of the correlation function becomes zero, which is equivalent to having the so called inphase correlator at $\tau_0$ perfectly synchronized to the received signal (see FIG. 2).

Within the state of the art approach it is assumed that the errors of the delay estimate are affected by a Gaussian error, whereas the variance of the error depends upon a set of parameters: bandwidth of the received signal, signal-to-noise ratio, correlator spacing $\Delta$, period of coherent correlation/integration, loop filter characteristics.

The inphase signal corresponding to a delay of $\tau_0$ is provided to the PLL, which carries out the phase estimation similarly to the DLL by using a control loop (FIG. 3). The error of the phase estimates is commonly considered to be also Gaussian.

Disadvantages of State of the Art Approach

The estimation errors of the DLL and PLL are considered to be Gaussian today, such that the associated likelihood function for the estimates is consequently also a Gaussian. Actually the likelihood function is not a Gaussian and the conventional approach is not able to consider this.

In addition the DLL adjusts the derivative of the correlation function such that it becomes zero. This method is suboptimal due to the approximation of the derivative and it is known that the delay can be estimated better, if the approximation becomes more accurate. Practically this is achieved by decreasing the correlator spacing $\Delta$, which yields improved performance with respect to the estimation error for the delay. Anyhow decreased spacing $\Delta$ deteriorates the dynamic performance of the DLL and leads to an increased probability of loosing lock, such that a trade-off between the different performance criteria is required.

SUMMARY OF THE INVENTION

The present invention in a first aspect provides a method for estimating parameters of a navigation signal received by a receiver which receives navigation signals through a plurality of paths wherein the parameters include data modulated on the navigation signal and complex amplitudes i.e. amplitude and phase shift, and time delays of the individual paths (equation (1)), the method comprising the steps of receiving the navigation signal ($y(t)$), sampling the received navigation signal ($y(t)$) and dividing the samples into blocks of a given length and grouping the samples of each block into a received vector ($y_k$) (equation (2)), sequentially estimating the parameters in terms of a posterior probability density function at a current time based on the navigation signals received at former times and the current time (equation (4)), wherein the sequential estimation comprises (i) a predicting stage (equation (3)) for estimating a prior probability density function of the parameters with respect to the navigation signals received at the former times, wherein the predicting stage is based on the posterior probability density function of the parameters at the former time with respect to the navigation signals received at the former times (equation (10)) and a parameter transition model describing the change of parameters between a former time just prior to the current time and the current time (equations (11) to (20)), and (ii) an updating stage (equation (4)) for estimating the posterior probability density function of the parameters with respect to the navigation signals received at the former times and at the current time, wherein the updating stage (equation (21)) is based on the prior probability density function with respect to the navigation signals received at the former times (equation (20)) and a likelihood for the assumption that based on the navigation signal currently received the parameters are included in the currently received navigation signal (equation (9)), transforming the received vector into a compressed vector ($y_{ck}$) having less elements than the number of samples of the received vector ($y_k$), wherein the transformation is performed substantially without loss of information using a correlator bank having a plurality of correlator reference signals (equations (6) to (8)), nonlinearly, recursively filtering the compressed vector ($y_{ck}$) such that the updating stage for all parameters together with the predicting stage for the data is represented (equations (13), (19) and (22)), and predicting the complex amplitude and time delays by performing equivalent time delay shifts and phase shifts of the correlator signals of the correlator bank.

In a second aspect of the present invention there is provided a method for estimating parameters of a navigation signal received by a receiver which receives navigation signals through a plurality of paths wherein the parameters include data modulated on the navigation signal and complex amplitudes i.e. amplitude and phase shift, and time delays of the individual paths (equation (1)), the method comprising the steps of receiving the navigation signal (y(t)), sampling the received navigation signal (y(t)) and dividing the samples into blocks of a given length and grouping the samples of each block into a received vector ($y_k$) (equation (2)), sequentially estimating the parameters in terms of a posterior probability density function at a current time based on the navigation signals received at former times and the current time (equation (4)), wherein the sequential estimation comprises (i) a predicting stage (equation (3)) for estimating a prior probability density function of the parameters with respect to the navigation signals received at the former times, wherein the predicting stage is based on the posterior probability density function of the parameters at the former time with respect to the navigation signals received at the former times (equation (10)) and a parameter transition model describing the change of parameters between a former time just prior to the current time and the current time (equations (11) to (20)), and (ii) an updating stage (equation (4)) for estimating the posterior probability density function of the parameters with respect to the navigation signals received at the former times and at the current time, wherein the updating stage (equation (21)) is based on the prior probability density function with respect to the navigation signals received at the former times (equation (20)) and a likelihood for the assumption that based on the navigation signal currently received the parameters are included in the currently received navigation signal (equation (9)), transforming the received vector into a compressed vector ($y_{ck}$) having less elements than the number of samples of the received vector ($y_k$), wherein the transformation is performed substantially without loss of information using a correlator bank having a plurality of correlator reference signals (equations (6) to (8)), and nonlinearly, recursively filtering the compressed vector ($y_{ck}$) such that the updating stage for all parameters is represented together with the predicting stage for all parameters (equations (13), (16), (18) and (22)).

The equations referred to above are mentioned in the description of the preferred embodiment.

One of the key features of the present invention is the possibility to transform the received vector comprising a plurality of samples of the received navigation signal, into a compressed vector having less elements than the number of samples of the received vector. By way of this compression step together with a suitable approximation of the sequential Bayesian estimator it is possible to represent all the probability density functions (namely the likelihood and the prior as well as the posterior probability density functions of the parameters) by a set of samples, which allows for efficient sequential posterior estimation of the signal parameters.

Both alternatives of the present invention use the sequential estimation of the parameters in terms of posterior probability density functions at a current time based on the navigation signals received at former times and the current time. According to the first alternative (claim 1) the compressed vector is nonlinearly and recursively filtered such that the updating stage of the sequential parameter estimation for all the parameters to be estimated together with the predicting stage of the sequential parameter estimation for the data parameters is represented. In this alternative of the present invention the complex amplitude and time delays are predicted by performing equivalent time delay shifts and phase shifts of the correlator signals of the correlator bank which was used when transforming the received vector into a compressed vector.

According to the second alternative (see claim 2) the compressed vector is nonlinearly and recursively filtered such that the updating stage for all the parameter is represented together with the predicting stage for all the parameters. In this embodiment performing equivalent time delay shifts and phase shifts of the correlator signals of the correlator bank is not used.

BRIEF DESCRIPTION OF THE DRAWINGS

The present invention will be described in more detail hereinbelow referring to the drawing in which.

DESCRIPTION OF A PREFERRED EMBODIMENT

Figure 1:
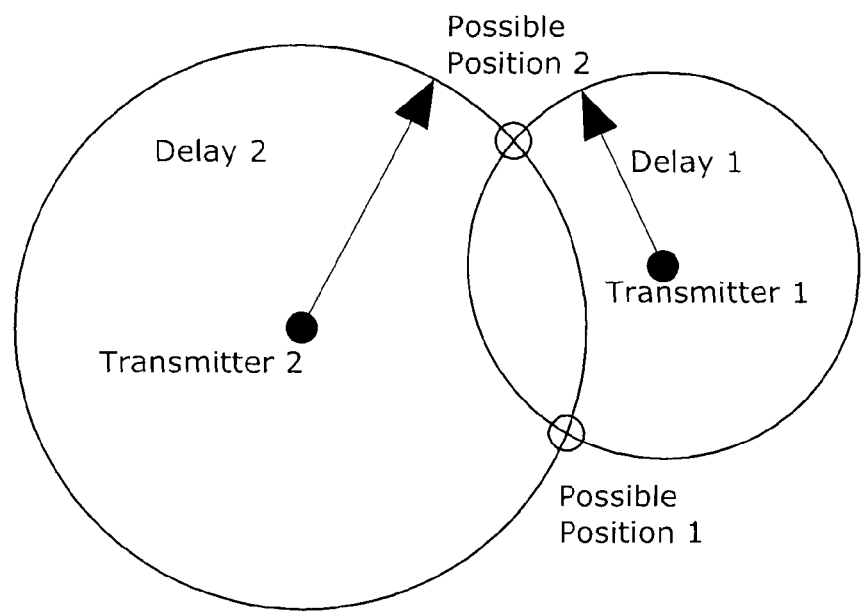
FIG. 1 is a representation for detecting a position using TOA in a two-dimensional scenario.
Figure 2:
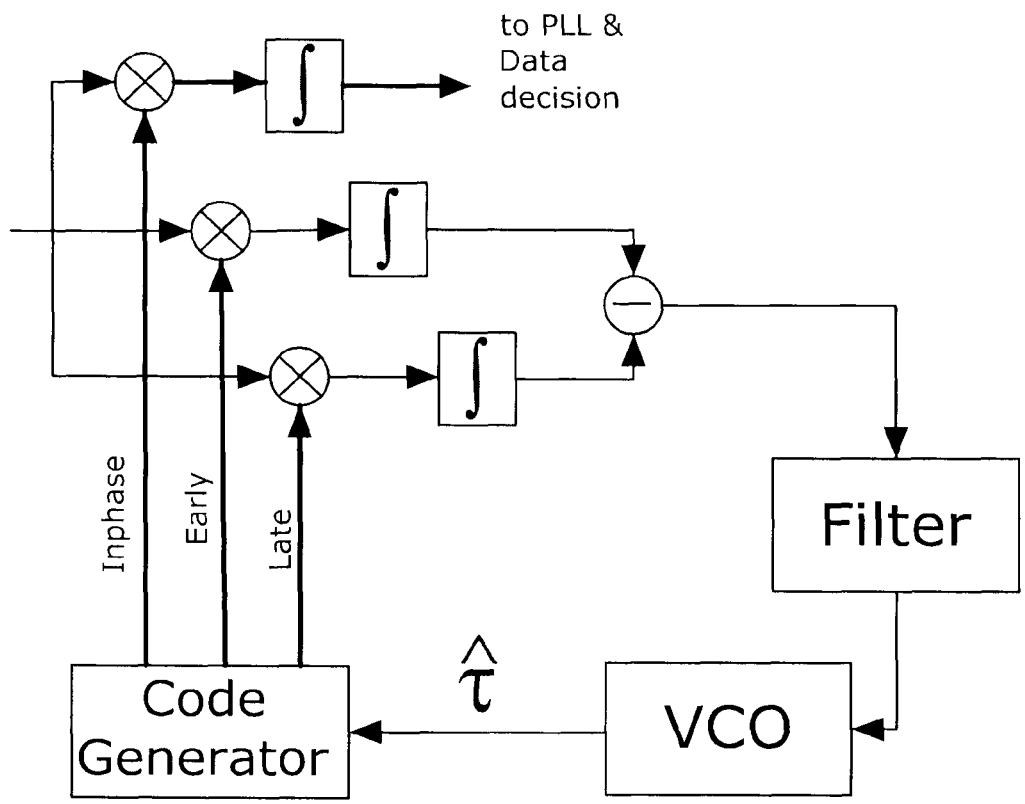
FIG. 2 is a block diagram showing the architecture of a DLL.
Figure 3:
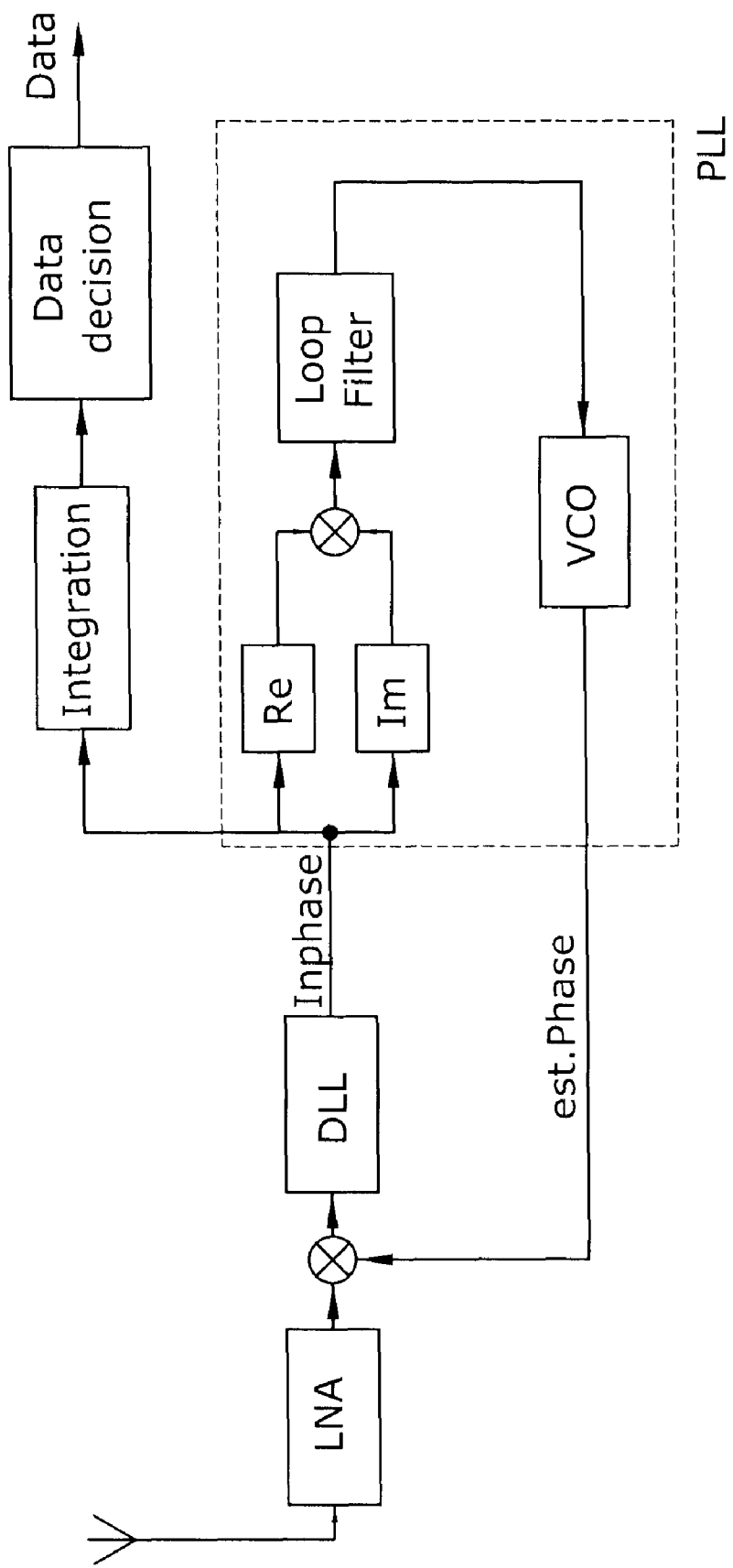
FIG. 3 is a block diagram showing a conventional GNSS receiver-architecture.

In particular high complexity arises from the evaluation of the likelihood, which requires operations upon a data set of many thousand samples for each code period of the received signal. Thus, within conventional navigation receivers tracking loops are used for estimating the signal parameters. It can be shown that signal compression techniques can overcome the problem of computational complexity, as the likelihood function can be formulated efficiently upon a reduced data set of much smaller size compared to the original data, where the reduced data set forms a sufficient statistic for the estimated signal parameters. As a consequence the evaluation of the likelihood becomes feasible with moderate cost, which allows an improved information hand over from the signal parameter estimation part to the navigational part of the receiver. Within this paper a novel approach for integrating a conventional tracking loop with a likelihood evaluator is proposed. It is shown that for the single path estimation problem the parameter information can be kept recursively in a data set of small size in a sequential estimation procedure by using a bank of first order IIR filters. The performance of the proposed method is assessed by computer simulations. The results show that the conventional delay lock loop is outperformed with respect to noise performance as well as with respect to the multipath bias whilst providing capabilities with respect to multipath monitoring and mitigation.

From the viewpoint of navigation receiver algorithm design, satellite navigation can be regarded as a parameter estimation problem, which requires the formulation of appropriate estimators within the given framework of real-time constraints. In general any kind of estimator is designed to provide estimates for parameters based upon observations. The maximum-likelihood (ML) estimator provides the parameter estimate, which maximizes the probability of the observations conditioned on the parameters. The maximum-aposteriori (MAP) estimator, which is similar to the ML-estimator, but does also incorporate prior knowledge, provides the parameter estimate which is the most likely one conditioned on the observations, and the mean square error (MSE) estimator provides the mean of the posterior density [1].

The implementation of any estimator for navigation signal parameters is practically challenging, especially when due to multipath reception several superimposed replica are taken into account. In particular high complexity arises from the evaluation of the likelihood, which requires operations upon a data set of many thousand samples for each code period of the received signal. Thus, within conventional navigation receivers tracking loops are used for estimating the signal parameters. It can be shown that signal compression techniques can overcome the problem of computational complexity, as the likelihood function can be formulated efficiently upon a reduced data set of much smaller size compared to the original data, where the reduced data set forms a sufficient statistic for the estimated signal parameters. As a consequence the evaluation of the likelihood becomes feasible with moderate cost, which allows an improved information handover from the signal parameter estimation part to the navigation part of the receiver.

Moreover, all these estimators are based on operations which obtain a "hard" estimation value from a "soft" probability density function (PDF). As actually only the entire PDF comprises all the information which can be inferred from the observations, every "hard" parameter decision based upon the PDF discards some of the information contained within the PDF. Consequently, it is advantageous to keep PDFs instead of hard estimates in order to improve system performance.

But unfortunately storage of PDFs can be complex, especially for general non-Gaussian PDFS. Indeed estimation of GNSS signal parameters produces general non-Gaussian PDFs, having lead so far to receiver architectures, which process hard estimates obtained by the tracking loops and assume the underlying PDF to be Gaussian, as it is the case implicitly within every navigation receiver and also for instance in a more sophisticated way for the vector DLL and all GNSS/INS hybridization schemes, which are based on Kalman filtering [2]. Particle filter approaches [3] can overcome the Gaussian constraint by representation of the PDF by a set of samples, and thus are capable of general nonlinear non-Gaussian sequential estimation problems. Anyhow as particle filters are only optimal for an infinite number of particles they are still rather a topic of scientific investigations and not used in practice very often.

The present invention allows for an efficient representation and calculation of entire PDFs characterizing the navigation signal parameter estimates without Gaussian constraints and without the need for particle representation.

Problem Formulation

Assume that the complex valued baseband-equivalent received signal is equal to $$y(t) = d(t) \sum_{i=1}^{N(t)} a_i(t) s(t - \tau_i(t)) + n(t) \tag{1}$$

where s(t) is the transmitted navigation signal, d(t) is the data signal modulated on the navigation signal, N(t) is the total number of paths reaching the receiver, and $a_i(t)$ and $\tau_i(t)$ are their individual complex amplitudes and time delays, respectively. The signal is disturbed by additive white Gaussian noise, n(t). Grouping blocks of L samples of the received signal at times $(n+kL)T_s$, n=0, ..., L−1, together into vectors $y_k$, k=0, 1, ..., this can be rewritten as $$y_k = d_k \sum_{i=1}^{N_k} a_{k,i} s(\tau_{k,i}) + n_k = S(\tau_k) a_k d_k + n_k \tag{2}$$

In the compact form on the right hand side the samples of the delayed signals are stacked together as columns of the matrix $S(\tau_k)$, $\tau_k=(\tau_{k,1}, ..., \tau_{k,Nk})$, and the amplitudes are collected in the vector $a_k=(a_{k,1}, ..., a_{k,Nk})$. It is assumed in equation 2 that the parameters $\tau_k$, $a_k$, $N_k$ and $d_k$ are constant within the corresponding time interval.

The objective is to estimate the parameters $\tau_k$, $a_k$, $N_k$ and $d_k$ for each time instance k in terms of probability density functions (PDF), namely the posteriors $p(a_k, \tau_k, d_k, N_k|y_k, ..., y_0)$. These PDFs contain "soft" reliability information for each parameter instead of a "hard" estimate only.

Sequential Bayesian Estimation

A general framework for generating such PDFs is given by the sequential Bayesian estimation approach [1] [6]. In principle the posteriors can be computed recursively with alternating calculation of the prediction (Chapman-Kolmogorov) equation $$p(a_k,\tau_k, d_k, N_k|y_{k-1}, ..., y_0) = \int p(a_k,\tau_k, d_k, N_k|a_{k-1},\tau_{k-1}, d_{k-1}, N_{k-1}) p(a_{k-1},\tau_{k-1},d_{k-1}, N_{k-1}|y_{k-1}, ..., y_0) da_{k-1} d\tau_{k-1} dd_{k-1} dN_{k-1} \tag{3}$$

and the update equation (calculation of posterior pdf):

$$p(a_k, \tau_k, d_k, N_k \mid y_k, ... , y_0) = \frac{p(y_k \mid a_k, \tau_k, d_k, N_k) p(a_k, \tau_k, d_k, N_k \mid y_{k-1}, ... , y_0)}{p(y_k \mid y_{k-1}, ... , y_0)} \tag{4}$$

Figure 4:
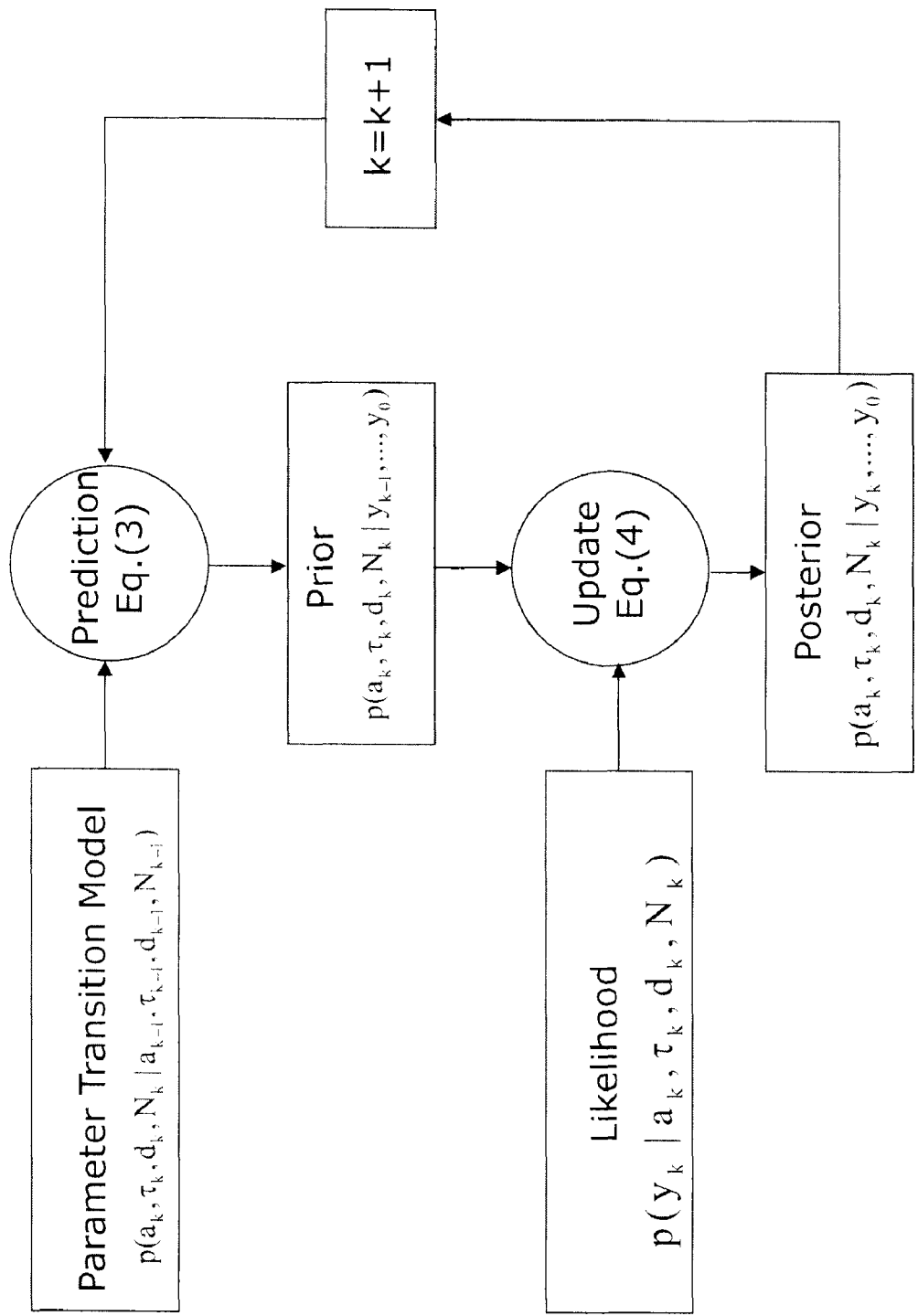
FIG. 4 is a diagram showing the sequential Bayesian estimation principle.

An illustration is given in FIG. 4.

Although equation 3 and equation 4 describe the exact solution to the estimation problem, in practice they provide only a conceptual solution in the sense that they cannot be determined analytically. Hence approximations or suboptimal algorithms have to be used instead [3].

In the following we propose a novel approach for an efficient approximation of a sequential Bayesian estimator for the problem formulated above and for its realization.

Approximation of the Sequential Bayesian Estimator

1. Efficient Representation of Likelihood:

The likelihood function for the considered problem is given by:

$$p(y_k | \tau_k, a_k, d_k, N_k) = \frac{1}{(2\pi)^{M/2}\sigma^M} \exp\left[-\frac{1}{2\sigma^2}(y_k - S(\tau_k)a_k d_k)^H (y_k - S(\tau_k)a_k d_k)\right] \quad (5)$$

With the data size reduction techniques presented in [4], [5] and [7] the long vector $y_k$ can be transformed into a subspace of much smaller size according to $$y_{c,k} = Q_c^H y_k, \quad S_c(\tau_k) = Q_c^H S(\tau_k) \quad (6)$$

$$Q_c^H Q_c = I \text{ and } Q_c Q_c^H = I, \quad (7)$$

Such that the likelihood can be expressed as $$p(y_k | \tau_k, a_k, d_k, N_k) = \quad (8)$$
$$C \cdot \exp\left[-\frac{1}{2\sigma^2}(-y_{c,k}^H S_c(\tau_k) a_k d_k - d_k^* a_k^H S_c(\tau_k)^H y_{c,k} + d_k^* a_k^H S_c(\tau_k)^H S_c(\tau_k) a_k d_k)\right]$$

2. Approximation of Prediction Stage:

Consider, without loss of generality, the single path estimation problem, i.e., $N_k=1$. Then the likelihood function is given by $$p(y_k | a_k, \tau_k, d_k) = C \cdot \exp\left[\frac{\Re\{d_k a_k y_{c,k}^H s_c(\tau)\}}{\sigma^2} - |a_k|^2 |d_k|^2 \frac{s_c^H(\tau_k) s_c(\tau_k)}{2\sigma^2}\right] \quad (9)$$

In the prediction stage the Chapman-Kolmogorov equation 3 combines this likelihood with the parameter transition model, represented by $p(a_k,\tau_k,d_k|a_{k-1},\tau_{k-1},d_{k-1})$. Consider the posterior from the last time $$p(a_{k-1}, \tau_{k-1}, d_{k-1} | y_{k-1}, \ldots, y_0) = \quad (10)$$
$$C \cdot \exp\left[\frac{\Re\{d_{k-1} a_{k-1} \bar{y}_{c,k-1}^H (d_{k-1}) s_c(\tau_{k-1})\}}{\sigma^2} - W_{k-1}|a_{k-1}|^2 |d_{k-1}|^2 \frac{s_c^H(\tau_{k-1}) s_c(\tau_{k-1})}{2\sigma^2}\right]$$

At first the prediction with respect to the data is considered $$p(a_k, \tau_k, d_k, a_{k-1}, \tau_{k-1} | y_{k-1}, \ldots, y_0) = \quad (11)$$
$$\sum_{d_{k-1}} p(a_k, \tau_k, d_k | a_{k-1}, \tau_{k-1}, d_{k-1})$$
$$p(a_{k-1}, \tau_{k-1}, d_{k-1} | y_{k-1}, \ldots, y_0) = p(a_k, \tau_k | a_{k-1}, \tau_{k-1})$$
$$\sum_{d_{k-1}} p(d_k | d_{k-1}) p(a_{k-1}, \tau_{k-1}, d_{k-1} | y_{k-1}, \ldots, y_0)$$

where the right hand side can be expressed as $$\sum_{d_{k-1}} p(d_k | d_{k-1}) p(a_{k-1}, \tau_{k-1}, d_{k-1} | y_{k-1}, \ldots, y_0) = \quad (12)$$
$$C_0 \sum_{d_{k-1}} p(d_k | d_{k-1}) \cdot \exp\left[\frac{\Re\{d_{k-1} a_{k-1} \bar{y}_{c,k-1}^H (d_{k-1}) s_c(\tau_{k-1})\}}{\sigma^2} - W_{k-1}|a_{k-1}|^2 |d_{k-1}|^2 \frac{s_c^H(\tau_{k-1}) s_c(\tau_{k-1})}{2\sigma^2}\right] =$$
$$C_0 \sum_{d_{k-1}} \frac{1}{M} \cdot \exp\left[\frac{\Re\{d_{k-1} a_{k-1} \Delta d_{k,k-1} \bar{y}_{c,k-1}^H (d_{k-1}) s_c(\tau_{k-1})\}}{\sigma^2} - W_{k-1}|a_{k-1}|^2 |d_{k-1}\Delta d_{k,k-1}|^2 \frac{s_c^H(\tau_{k-1}) s_c(\tau_{k-1})}{2\sigma^2}\right] \approx$$
$$C_1 \max_{d_{k-1}} \exp\left[\frac{\Re\{d_{k-1} a_{k-1} \Delta d_{k,k-1} \bar{y}_{c,k-1}^H (d_{k-1}) s_c(\tau_{k-1})\}}{\sigma^2} - W_{k-1}|a_{k-1}|^2 |d_{k-1}\Delta d_{k,k-1}|^2 \frac{s_c^H(\tau_{k-1}) s_c(\tau_{k-1})}{2\sigma^2}\right] =$$
$$C_1 \exp\left[\frac{\Re\{d_k a_{k-1} \hat{y}_{c,k-1}^H (d_k) s_c(\tau_{k-1})\}}{\sigma^2} - W_{k-1}|a_{k-1}|^2 |d_k|^2 \frac{s_c^H(\tau_{k-1}) s_c(\tau_{k-1})}{2\sigma^2}\right]$$

Here the following relations have been used:

$$\Delta d_{k,k-1} = \frac{d_k}{d_{k-1}} \quad (13)$$

$$\Delta d^{(i)} = \frac{d^{(i)}}{d^{max}}, \quad i = 1, \ldots, M$$

$$d^{max} = \arg\max_{d^{(i)}} p(a_{k-1}, \tau_{k-1}, d_{k-1} = d^{(i)} | y_{k-1}, \ldots, y_0)$$

$$\approx \arg\max_{d^{(i)}} \bar{y}_{c,k-1}(d_{k-1} = d^{(i)})$$

$$\hat{y}_{c,k-1}(d_k = d^{(i)}) = \bar{y}_{c,k-1}(d_{k-1} = d^{max}) \cdot \Delta d^{(i)}$$

In order to complete the prediction with respect to a and τ we need to perform $$p(a_k,\tau_k,d_k|y_{k-1},\ldots,y_0) = $$
$$\int p(a_k,\tau_k,d_k,a_{k-1},\tau_{k-1}|y_{k-1},\ldots,y_0)da_{k-1}d\tau_{k-1} \quad (14)$$

We simplify this stage by a mean shift with respect to a and τ of the function $$\exp\left[\frac{\Re\{d_k a_{k-1} \hat{y}_{c,k-1}^H (d_k) s_c(\tau_{k-1})\}}{\sigma^2} - W_{k-1}|a_{k-1}|^2 |d_k|^2 \frac{s_c^H(\tau_{k-1}) s_c(\tau_{k-1})}{2\sigma^2}\right] \quad (15)$$

which is achieved by the following operation on the sample points that represent this posterior:

$$\tilde{y}_{c,k-1}(d_k) = \Delta a M_{s_c} \text{diag}[(\Phi(\Delta\tau)]M_{s_c}^{-1}\hat{y}_{c,k-1}(d_k) \quad (16)$$

This expression is based on a signal interpolation according to $$S_c(\tau) = M_{s_c}\Phi(\tau) \quad (17)$$

with a convolution matrix $M_{s_c}$ and the Vandermonde vector function $\Phi(\tau)$ [7].

If it is known that the data is not changing from time k−1 to k the data prediction does not have to be carried out and $$\tilde{y}_{c,k-1}(d_k) = \Delta a M_{s_c} \text{diag}[\Phi(\Delta\tau)] M_{s_c}^{-1} \bar{y}_{c,k-1}(d_k) \quad (18)$$

In practice equation 16 and equation 18 can be reduced to $$\tilde{y}_{c,k-1}(d_k) = \begin{cases} \bar{y}_{c,k-1}(d_k) & \text{if } d_k = d_{k-1} \text{ by definition} \\ \hat{y}_{c,k-1}(d_k) & \text{otherwise} \end{cases} \quad (19)$$

when the shifts $\Delta\tau$ and $\Delta a$ are performed by means of equivalent delay and phase shifts of the correlator reference signals.

Furthermore a widening by some factor $w<1$ is performed, resulting in $$p(a_k, \tau_k, d_k \mid y_{k-1}, \ldots, y_0) = \quad (20)$$

$$C \cdot \exp\left[w\left(\frac{\Re\{d_k a_k \tilde{y}_{c,k-1}^H(d_k) s_c(\tau_k)\}}{\sigma^2} - W_{k-1}|a_k|^2|d_k|^2 \frac{s_c^H(\tau_k)s_c(\tau_k)}{2\sigma^2}\right)\right]$$

This expression for the prior pdf replaces the ideal prior given in equation 3.

3. Simplified Update Stage:

Using equation 9 and equation 20 within equation 4 gives the posterior pdf $$p(a_k, \tau_k, d_k \mid y_k, \ldots, y_0) = \quad (21)$$

$$C \cdot p(y_k \mid a_k, \tau_k, d_k) p(a_k, \tau_k, d_k \mid y_{k-1}, \ldots, y_0) =$$

$$C \cdot \exp\left[\frac{\Re\{d_k a_k y_{c,k}^H s_c(\tau)\}}{\sigma^2} - |a_k|^2|d_k|^2 \frac{s_c^H(\tau_k)s_c(\tau_k)}{2\sigma^2}\right] \cdot$$

$$\exp\left[w\left(\frac{\Re\{d_k a_k \tilde{y}_{c,k-1}^H(d_k) s_c(\tau_k)\}}{\sigma^2} - W_{k-1}|a_k|^2|d_k|^2 \frac{s_c^H(\tau_k)s_c(\tau_k)}{2\sigma^2}\right)\right]$$

Using the notation $$\bar{y}_{c,k}^H(d_k) = y_{c,k}^H + w \tilde{y}_{c,k-1}^H(d_k) \quad (22)$$

and $$W_k = \sum_{i=0}^{k} w^i \quad (23)$$

the posterior in equation 21 can be written as $$p(a_k, \tau_k, d_k \mid y_k, \ldots, y_0) = \quad (24)$$

$$C \cdot \exp\left[\frac{\Re\{d_k a_k \bar{y}_{c,k}^H(d_k) s_c(\tau_k)\}}{\sigma^2} - W_k|a_k|^2|d_k|^2 \frac{s_c^H(\tau_k)s_c(\tau_k)}{2\sigma^2}\right]$$

which is the time k equivalent to equation 10.

Efficient Realization of the Approximated Sequential Bayesian Estimator

Figure 5:
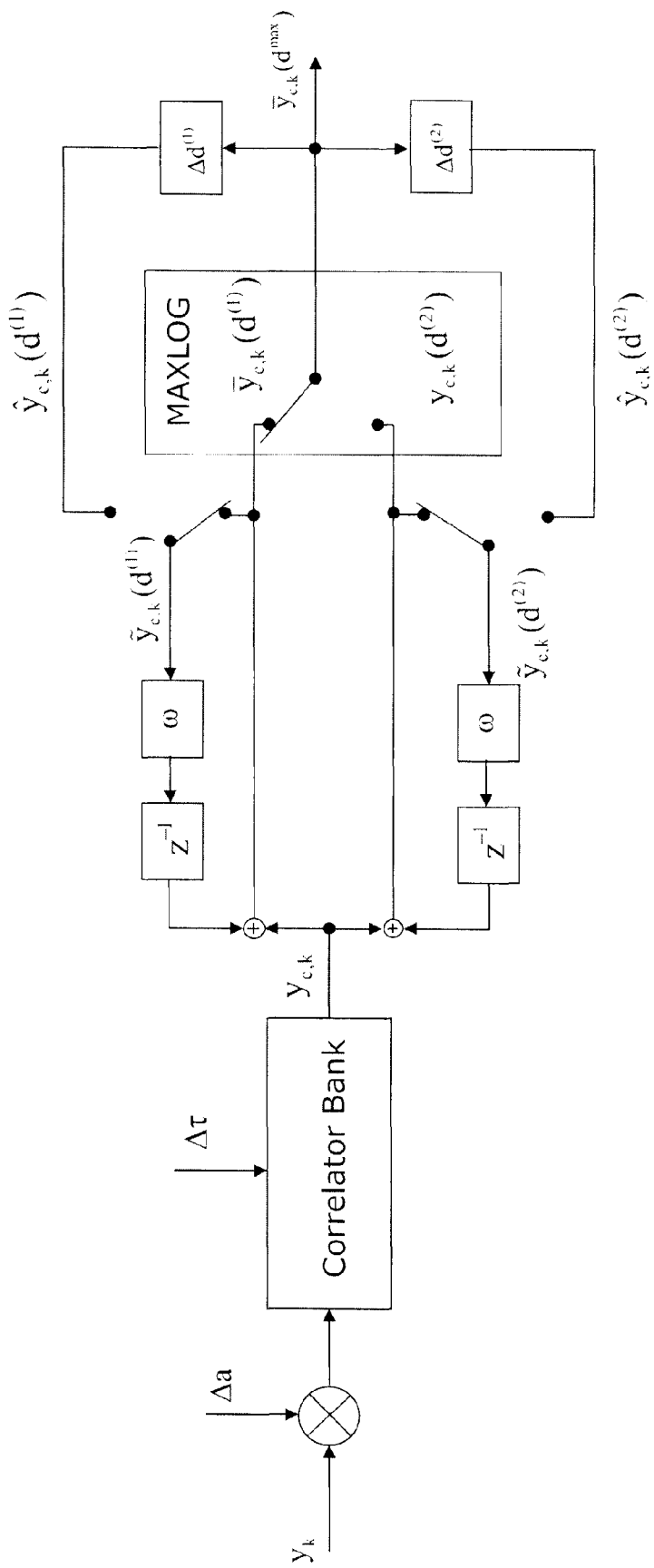
FIG. 5 shows a realization of a proposed sequential estimator according to the present invention.

Due to the approximations 1-3 described above an efficient realization of the estimator is possible. Namely, the recursive estimation process given in FIG. 4 can be transformed into the logarithmic domain in terms of a nonlinear recursive filtering of $y_c$, like illustrated in FIG. 5.

The correlator transforms the received sampled signal $y_k$ into the reduced space as defined by the data size reduction given in equation 6. The output $y_{c,k}$ enters the recursive relation (equation 22) for the different data hypotheses. According to equation 19 the data prediction is performed as described by equation 13 whenever required.

The output posterior in equation 24 can now be evaluated from $\bar{y}_{c,k}(d^{(i)})$ at any desired time, whilst it is not mandatory that this calculation is performed for each time instance k.

Figure 6:
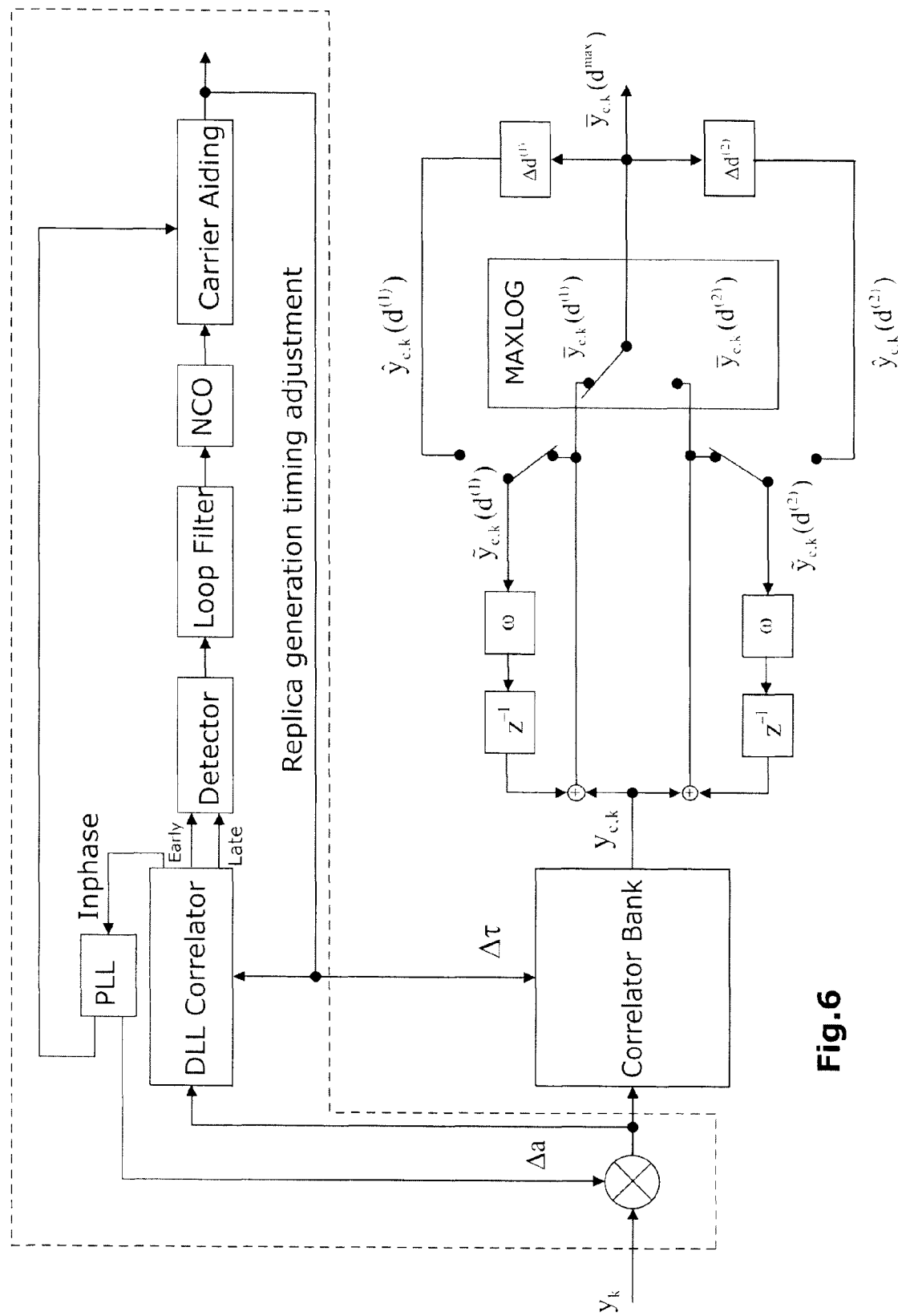
FIG. 6 shows the integration of the estimator according to FIG. 5 into a conventional receiver.

A possible integration into a conventional navigation receiver is depicted in FIG. 6.

Summary of Key Ideas

The present invention provides a method for efficient sequential estimation of navigation signal parameters in terms of probability density functions. It is suitable for extension of and integration into existing navigation receivers without affecting the state-of-the-art elements.

- The proposed new method allows efficient representation and calculation of approximate posteriors $p(a_k, \tau_k, d_k, N_k|y_k, \ldots, y_0)$.
- The approximation is chosen in a particular way allowing the efficient implementation.
- Correlator bank for data size reduction.
- Nonlinear filter for prediction and update, which runs clocked by k.
- Each data hypothesis has its own filter branch.
- Linear filter if data does not change by definition, otherwise nonlinear filter.
- Nonlinear feedback due to MAXLOG data marginalization
- Possible feed in of external movement by means of $\Delta\tau$ and $\Delta a$ (DLL, Inertial etc.).
- Evaluation of the posterior (equation 24) is decoupled from the sequential calculation of the samples $\bar{y}_{c,k}(d^{(i)})$ that are required to evaluate it, such that the real-time constraints are relaxed.

REFERENCES

[1] Kay, Steven M., Fundamentals of Statistical Signal Processing—Estimation Theory, Prentice Hall Signal Processing Series, Prentice Hall, New Jersey,

[2] Parkinson, Bradford W., Spilker, James J. Jr., Global Positioning System: Theory and Applications Volume I & II, Progress in Astronautics and Aeronautics, Volume 164, American Institute of Aeronautics and Astronautics, Washington, 1996

[3] Ristic, Branko, Arulampalam, Sanjeev, Gordon, Neil, Beyond the Kalman Filter—Particle Filters for Tracking Applications, Artech House, Boston-London, 2004

[4] Jesus Selva Vera, "Efficient Multipath Mitigation in Navigation Systems", Ph.D. thesis, DLR/Polytechnical University of Catalunya, 2004

[5] Jesus Selva, "Complexity reduction in the parametric estimation of superimposed signal replicas", Signal Processing, Elsevier Science Volume 84, Issue 12, December 2004, Pages 2325-2343

[6] A. H. Jazwinski, Stochastic Processes and Filtering Theory. New York: Academic Press, 1970

[7] Michael Lentmaier, Bernhard Krach, "Maximum Likelihood Multipath Estimation in Comparison with Conventional Delay Lock Loops", Proceedings of the ION GNSS 2006, Fort Worth, Tex., USA, 2006

The invention claimed is:

1. A method for estimating parameters of a navigation signal received by a receiver which receives navigation signals through a plurality of paths wherein the parameters include data modulated on the navigation signal and complex amplitudes i.e. amplitude and phase shift, and time delays of the individual paths, the method comprising the steps of:

receiving the navigation signal, sampling the received navigation signal and dividing the samples into blocks of a given length and grouping the samples of each block into a received vector, sequentially estimating the parameters in terms of a posterior probability density function at a current time based on the navigation signals received at former times and the current time, wherein the sequential estimation comprises (i) a predicting stage for estimating a prior probability density function of the parameters with respect to the navigation signals received at the former times, wherein the predicting stage is based on the posterior probability density function of the parameters at the former time with respect to the navigation signals received at the former times and a parameter transition model describing the change of parameters between a former time just prior to the current time and the current time, and (ii) an updating stage for estimating the posterior probability density function of the parameters with respect to the navigation signals received at the former times and at the current time, wherein the updating stage is based on the prior probability density function with respect to the navigation signals received at the former times and a likelihood for the assumption that based on the navigation signal currently received the parameters are included in the currently received navigation signal, transforming the received vector into a compressed vector having less elements than the number of samples of the received vector, wherein the transformation is performed substantially without loss of information using a correlator bank having a plurality of correlator reference signals, nonlinearly, recursively filtering the compressed vector such that the updating stage for all parameters together with the predicting stage for the data is represented, and predicting the complex amplitude and time delays by performing equivalent time delay shifts and phase shifts of the correlator signals of the correlator bank.

2. A method for estimating parameters of a navigation signal received by a receiver which receives navigation signals through a plurality of paths wherein the parameters include data modulated on the navigation signal and complex amplitudes i.e. amplitude and phase shift, and time delays of the individual paths, the method comprising:

receiving the navigation signal, sampling the received navigation signal and dividing the samples into blocks of a given length and grouping the samples of each block into a received vector, sequentially estimating the parameters in terms of a posterior probability density function at a current time based on the navigation signals received at former times and the current time, wherein the sequential estimation comprises (i) a predicting stage for estimating a prior probability density function of the parameters with respect to the navigation signals received at the former times, wherein the predicting stage is based on the posterior probability density function of the parameters at the former time with respect to the navigation signals received at the former times and a parameter transition model describing the change of parameters between a former time just prior to the current time and the current time, and (ii) an updating stage for estimating the posterior probability density function of the parameters with respect to the navigation signals received at the former times and at the current time, wherein the updating stage is based on the prior probability density function with respect to the navigation signals received at the former times and a likelihood for the assumption that based on the navigation signal currently received the parameters are included in the currently received navigation signal, transforming the received vector into a compressed vector having less elements than the number of samples of the received vector, wherein the transformation is performed substantially without loss of information using a correlator bank having a plurality of correlator reference signals, and nonlinearly, recursively filtering the compressed vector such that the updating stage for all parameters is represented together with the predicting stage for all parameters.

* * * * *